June 29, 1965   M. J. STURTEVANT ET AL   3,191,988
VEHICLE HEADLINING RETAINER
Filed March 23, 1962   2 Sheets-Sheet 1
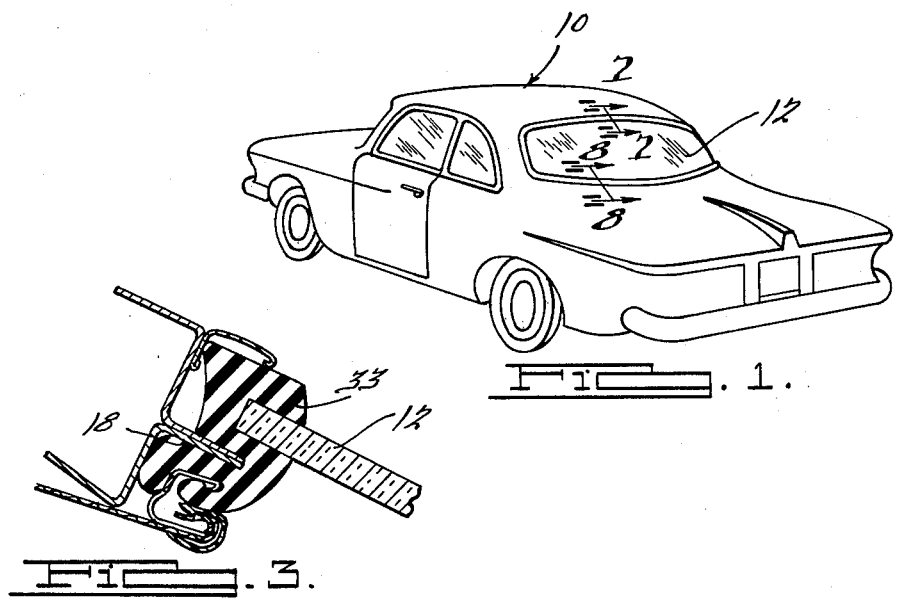
FIG. 1.
FIG. 3.
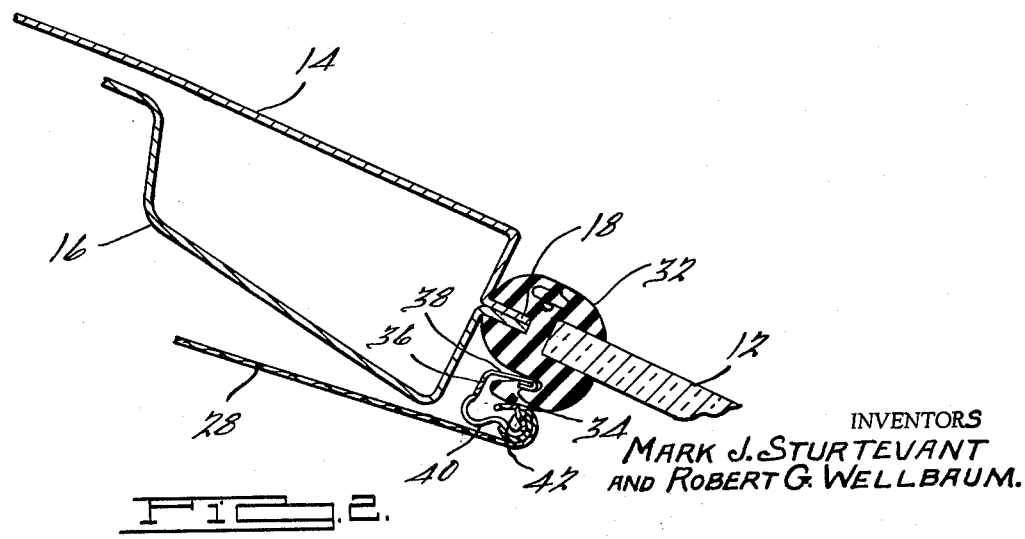
FIG. 2.
INVENTORS
MARK J. STURTEVANT
AND ROBERT G. WELLBAUM.
BY Harness and Harris

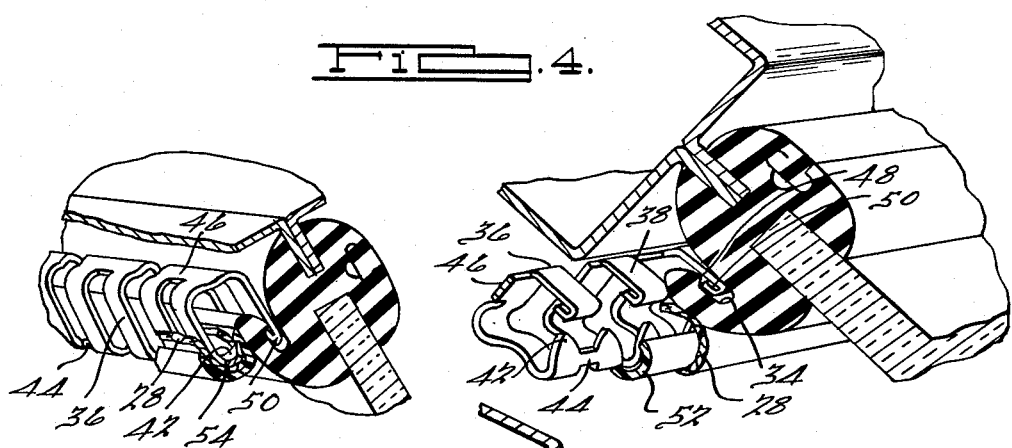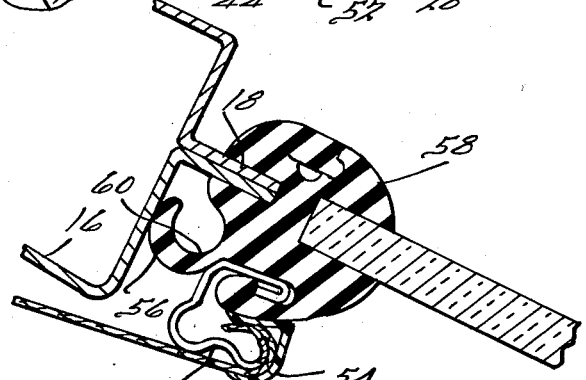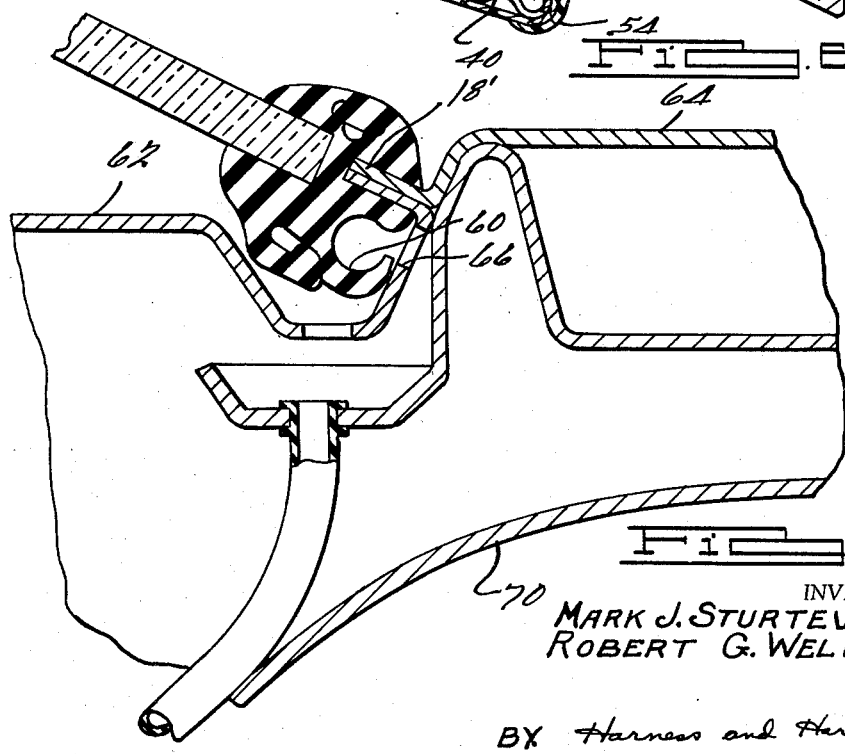
INVENTORS
MARK J. STURTEVANT
ROBERT G. WELLBAUM

United States Patent Office 3,191,988
Patented June 29, 1965

3,191,988
VEHICLE HEADLINING RETAINER
Mark J. Sturtevant, Grosse Pointe, and Robert G. Wellbaum, Taylor, Mich., assignors to Chrysler Corporation, Highland Park, Mich., a corporation of Delaware
Filed Mar. 23, 1962, Ser. No. 181,921
11 Claims. (Cl. 296—137)

This invention relates to means for securing headlining around window openings in a vehicle body and more particularly to means for securing such headlining around the windshield and rear window of an automobile.

A copending application Serial No. 181,920, filed March 23, 1962, by M. J. Sturtevant and D. D. Patton teaches the use of clips and related means for securing automotive headlining to windcord material used around door openings. It is a principal object of this invention to apply the teachings of the above mentioned application and to supplement these teachings to the end that headlining may be retained in an improved manner around the periphery of the rear window and windshield of an automobile.

It is a further object of this invention to provide a means for mounting headlining such that the headlining may be installed around the window opening as the last step of the installation rather than as has been common practice in the past to install the headlining first and then install the weatherstrip and glass. The subsequent installation of the rubber weatherstrip and glass is usually accompanied by the use of cements and sealers which may stain the headlining and detract from the finished appearance of the vehicle.

It is an additional object of the invention to provide headlining retention means such that the headlining is retained in spaced relationship to the metallic roof structure of the automobile so that in the event water leakage occurs water will not be readily transmitted to the headlining to cause wicking of the latter.

It is also an object of the invention to provide a drain trough for water in the window retaining weatherstrip to drain such leakage water off and prevent wicking of the headlining.

It is also a principal object of this invention to provide a headlining retention means that conceals a substantial portion of the rubber weatherstrip and thereby improves the appearance of the vehicle and minimizes the necessity of painting such weatherstrip or otherwise masking its inherently unattractive appearance.

It is an additional object of the invention to provide a headlining retention means that is adapted to receive trim plastic edging pieces which may be colored or vapor plated to give a polished chrome appearance and thus economically impart a quality appearance to the assembly.

It is a further object of the invention to provide a headlining retention means which retains the headlining over a portion of the surface of the rubber weatherstrip instead of having a portion of the weatherstrip cover the edge of the headlining as has been conventional practice in the past.

In the drawings:

FIG. 1 is a perspective view of an automobile;

FIG. 2 is a vertical section at the upper portion of the rear window of an automobile, taken generally on the planes of section line 7—7 of FIG. 1, illustrating a construction incorporating our invention;

FIG. 3 is a view similar to FIG. 2, but illustrating the application of our invention to another type of window mounting;

FIG. 4 is a perspective view of the device illustrated in FIG. 2;

FIG. 5 is a perspective view from the inside of the vehicle resembling the device of FIG. 4, but differing therefrom in one detail;

FIG. 6 is a sectional view taken on the line 7—7 of FIG. 1 illustrating a modification of the invention; and FIG. 7 is a sectional view taken on the line 8—8 of FIG. 1.

An automobile 10 is illustrated in FIG. 1 as provided with a rear window 12. It is to be understood that while the description herein will be confined to a showing of the rear window construction it is equally applicable to the upper portion of a conventional windshield construction.

The construction of an automobile generally includes a metallic outer panel and a metallic inner panel which are formed with abutting flanges around the periphery of the window opening to define a fence to which a rubber-like weatherstrip is mounted by means of reception of the fence in a slot provided in the weatherstrip. A sheet of glass which serves as the window is received in a second slot formed in the weatherstrip generally oppositely disposed to said fence slot. The inner panel is provided with a plurality of barbs formed along the upper and side edges of the window opening and a fabric headlining is impaled upon the barbs and cemented to the surface of the inner panel around the periphery of the window opening. A suitable decorative trim molding may be applied in conventional manner around the outside of the window opening to conceal a portion of the weatherstrip.

In common practice it is usual to assemble the above-mentioned components by a sequence of steps including cementing the headlining to the panel, impaling the headlining on barbs and subsequently installing the weatherstrip and window in the opening. The use of cements and sealing material during the installation of the weatherstrip and window frequently causes stains to be incurred by the fabric headlining.

In addition, the common commercial construction leaves exposed such a large portion of the weatherstrip on the interior of the automobile that this large expanse of rubber is somewhat unsightly and frequently on more expensive grade lines of automobiles it is necessary to paint this rubber.

The prior art also has a disadvantage in that should water leakage occur around the mounting of the weatherstrip on the fence the presence of water inboard of the fence wets the fabric headlining and causes the latter to wick with water stains ultimately appearing on the visible portion of headlining.

In order to improve upon the above mentioned commercial construction applicants have illustrated in FIG. 2 an improved headlining mounting and it should be noted that with this construction the headlining covers a portion of the inner surface of the rubber weatherstrip thereby concealing a portion of the latter. Similar reference numerals are used herein where possible.

Referring to FIG. 2 it will be noted that the rubber weatherstrip 32 is received on the fence 18, formed by the abutting flanges of outer body panel 14 and inner body panel 16, and supports a window 12 in a manner similar to that described in connection with the prior art. However, the rubber weatherstrip 32 is provided with a slot 34 around its inner surface and a clip device 36 of generally U-shaped cross section has one leg 38 retained in slot 34. Clip device 36 has another leg 40 which is provided with a plurality of barbs 42 which are directed inwardly toward the weatherstrip 32.

Reference may be made to FIG. 4 for a better showing of the clip device 36. The clip device 36 consists of a plurality of U-shaped elements arranged in parallel relation. Some of the adjacent U-shaped elements are connected by bridging members 44 adjacent barbs 42. Alternate U-shaped elements do not contain a bridging member 44 therebetween, but instead are provided with a bridge 46 adjacent the bight of the U. The weatherstrip 32 is preferably provided with an enlarged end 48 adjacent the entrant portion of slot 34 to retain the leg 38 in assembled relation therein. The legs 38 are provided with a return bent end portion 50 which is adapted to interfere with enlarged end 48 for this purpose.

A plastic extrusion 52 of C-shape is preferably snapped over the lower end of legs 40 to present a smooth lower surface around which headlining material 28 may be stretched. The headlining material has its end portion forced between weatherstrip 32 and barbs 42 for impalment on the latter.

It should be noted that this construction permits headlining 28 to conceal a substantial portion of the rubber weatherstrip 32 from view from the interior of the vehicle and that the headlining is not in close proximity to the inner roof panel 16 to receive water therefrom.

Referring to FIGS. 5 and 6 it will be seen that a similar construction is illustrated, but in this construction the plastic extrusion 52 has been omitted and instead an exterior plastic extrusion 54 has been used. The extrusion 54 is snapped over the lower edge of leg 40 of clip 36. The exterior plastic extrusion 54 may be provided with color or may be vapor plated to give a polished chrome appearance to the trim edge of the headlining material.

Referring to FIGS. 6 and 7 it will be seen that an additional refinement has been illustrated in the way of a drain trough which is formed by a curved leg 56 integrally formed on a weatherstrip 58 which otherwise resembles the weatherstrip 32 of previous figures. The curved leg 56 is in abutting relation with a portion of the inner panel 16 to define a rain trough 60 extending around the periphery of the window opening. This rain trough 60 further minimizes the possibility of water wetting the headlining material 28.

It will be seen in FIG. 6 that should water leak around fence 18 it will be collected in trough 60. It will then flow laterally across the top of the window and down the sides of the window in the extensions of trough 60 which are not illustrated, but obviously would exist due to the continuation of the weatherstrip 58 around the periphery of the window opening. FIG. 7 illustrates a section taken on the line 8—8 of FIG. 1 and shows the position of the trough 60 along the lower edge of the window opening. It will be noted that a metal body panel 62 cooperates with an exterior body panel 64 to form a continuation of the above mentioned fence 18 which has been designated in this figure by the numeral 18'. The body panel 62 is provided with a plurality of openings 66 and 68 through which water draining out of trough 60 will flow for subsequent discharge downwardly through suitable drain means to a wheel house 70 for discharge to the exterior of the vehicle.

FIG. 3 is a vertical sectional view similar to FIG. 2 with the exception that it shows the invention applied to a weatherstrip 33 which is of a type commonly used on some automobiles and characterized by the fact that the window 12 is laterally displaced relative to fence 18 instead of being coplanar therewith.

We claim:

1. In an automobile body having a roof and structure defining an opening, a strip of resilient weatherstrip extending around the periphery of such opening and having an inner surface facing the interior of said body, said strip having an aperture in said inner surface, headlining material carried on the underside of said roof, and a flexible spring steel headlining retainer anchored in the above mentioned aperture and having an arm thereon in close proximity to said weatherstrip inner surface, an edge portion of said headlining material being retained between said arm and said weatherstrip inner surface for support and trimming of said headlining material adjacent the periphery of the above mentioned opening and to conceal said retainer beneath said headlining material.

2. In an automobile body having a roof and structure defining an opening, a strip of resilient weatherstrip extending around the periphery of such opening and having an inner surface facing the interior of said body, headlining material carried on the underside of said roof, and a flexible headlining retainer secured to said weatherstrip on said inner surface and having a yieldable arm thereon urged toward said weatherstrip inner surface, an edge portion of said headlining material being retained between said arm and said weatherstrip inner surface for support and trimming of said headlining material adjacent the periphery of the above mentioned opening and to conceal said retainer beneath said headlining material.

3. In an automobile body having a roof and structure defining an opening, a strip of resilient weatherstrip extending around the periphery of such opening and having an inner surface facing the interior of said body, said inner surface being provided with a slot, headlining material carried on the underside of said roof, and a length of flexible headlining retainer secured to said weatherstrip by retention of a portion of said retainer in the above mentioned slot, said retainer having an arm thereon in close proximity to said weatherstrip inner surface, an edge portion of said headlining material being retained between said arm and said weatherstrip inner surface to provide a trim visible edge on the headlining material and to conceal said retainer beneath said headlining material.

4. In an automobile body having a roof and structure defining an opening, a window in the opening and a strip of resilient weatherstrip interposed between said structure and said window, said weatherstrip having an inner surface facing the interior of said body with said inner surface provided with an elongated slot intermediate said structure and said window, and a flexible headlining retainer of substantial length and having a U-shaped cross section with one leg thereof received in the above mentioned slot and the other leg thereof provided with a portion in close proximity to said inner surface of said weatherstrip to accommodate insertion and retention of edge portions of said headlining material therebetween to provide a neat appearing juncture between said weatherstrip and headlining material with a substantial portion of said weatherstrip surface and said retainer concealed by headlining material.

5. In an automobile body having a roof and structure defining an opening, a window in the opening and a strip of resilient weatherstrip interposed between said structure and said window, said weatherstrip having an inner surface facing the interior of said body with said inner surface provided with an elongated slot intermediate said structure and said window, and a flexible headlining retainer of substantial length and having a U-shaped cross section with one leg thereof received in the above mentioned slot and the other leg thereof provided with a plurality of barbs directed toward said inner weatherstrip surface to accommodate insertion and retention of edge portions of said headlining material therebetween and impaling of said headlining on said barbs to provide a neat appearing juncture between said weatherstrip and headlining material with a substantial portion of said weatherstrip surface and said retainer concealed by headlining material.

6. In an automobile body having a roof and structure defining an opening, a window in the opening and a strip of resilient weatherstrip interposed between said structure and said window, said weatherstrip having an inner surface facing the interior of said body with said inner surface provided with an elongated slot intermediate said structure and said window, a flexible headlining retainer of substantial length and having a U-shaped cross section with one leg thereof received in the above mentioned slot and the other leg thereof provided with a portion in close proximity to said inner surface of said weatherstrip to accommodate insertion and retention of edge portions of said headling material therebetween to conceal a substantial portion of said weatherstrip surface and said retainer beneath headlining material, and a supplemental trim element having a first portion retained between said other leg of said retainer with its associated headlining and said inner surface of said weatherstrip, said supplemental trim element having a second portion overlying the edge of said headlining material.

7. In a structure defining an opening, a window in the opening and a strip of resilient weatherstrip interposed between said structure and said window, said weatherstrip having an inner surface facing the interior of said structure with said inner surface provided with an elongated slot intermediate said structure and said window, a flexible headlining retainer of substantial length and having a U-shaped cross section with one leg thereof received in the above mentioned slot and the other leg thereof provided with a portion in close proximity to said inner surface of said weatherstrip to accommodate insertion and retention of edge portions of said headlining material therebetween to conceal a substantial portion of said weatherstrip surface and said retainer beneath headlining material, and a trim element of C shaped cross section and substantial length embracing the inner surface of said headlining and said retainer to decorate the visible edge of said headlining.

8. In an automobile body having a roof and structure defining an opening, a window in the opening and a strip of resilient weatherstrip circumscribing said window and interposed between said structure and said window, said weatherstrip having a trough formed therein and extending across the top of said window and down the sides thereof to conduct water to remote portions of said automobile body for subsequent drainage therefrom, said weatherstrip further being provided with an inner surface facing the interior of said body and said inner surface having an elongated slot intermediate said structure and said window, and a flexible headlining retainer of substantial length and having a U-shaped cross section with one leg thereof received in the above mentioned slot and the other leg thereof provided with a portion in close proximity to said inner surface of said weatherstrip to accommodate insertion and retention of edge portions of said headlining material therebetween to conceal a substantial portion of said weatherstrip surface and said retainer beneath headlining material.

9. In an automobile body having a roof and structure defining an opening, a strip of resilient weatherstrip extending around the periphery of such opening suitably secured to said structure defining said opening, said weatherstrip having an inner surface facing the interior of said body, an aperture formed in said inner surface, headlining material carried beneath the underside of said roof, a flexible headlining retainer of generally U-shaped cross-sectional configuration having one leg thereof received in said aperture and the other leg thereof directed generally inwardly of said opening and terminating in at least close proximity to said inner surface, a plurality of barbs formed on said other leg directed generally outwardly of said opening, and an elongated member carried by said other leg providing a substantially smooth surface of curvature directed generally inwardly of said opening, the headlining material having edge portions curled over said surface of curvature and inserted generally between said other leg and said inner surface of said weatherstrip in a manner impaling said edge portions on said barbs.

10. In an automobile body having a roof and structure defining an opening, a strip of resilient weatherstrip extending around the periphery of such opening suitably secured to said structure defining said opening, said weatherstrip having an inner surface facing the interior of said body, an aperture formed in said inner surface, headlining material carried beneath the underside of said roof, a flexible headlining retainer of generally U-shaped cross-sectional configuration having one leg thereof received in said aperture and the other leg thereof directed generally inwardly of said opening and terminating in at least close proximity to said inner surface, a plurality of barbs formed on said other leg directed generally outwardly of said opening, and an elongated member carried by said other leg providing a substantially smooth surface of curvature directed generally inwardly of said opening, the headlining material having edge portions curled over said surface of curvature and inserted generally between said other leg and said inner surface of said weatherstrip in a manner impaling said edge portions on said barbs, said curled-over edge portions forming a juncture with said weatherstrip in a manner concealing said retainer and a substantial portion of said inner surface of said weatherstrip from view.

11. In an automobile body having a roof and structure defining an opening, a strip of resilient weatherstrip extending around the periphery of such opening suitably secured to said structure defining said opening, said weatherstrip having an inner surface facing the interior of said body, an aperture formed in said inner surface, headlining material carried beneath the underside of said roof, a flexible headlining retainer of generally U-shaped cross-sectional configuration having one leg thereof received in said aperture and the other leg thereof directed generally inwardly of said opening and terminating in at least close proximity to said inner surface, a plurality of barbs formed on said other leg directed generally outwardly of said opening, and an elongated member carried by said other leg providing a substantially smooth surface of curvature directed generally inwardly of said opening, the headlining material having edge portions curled over said surface of curvature and inserted generally between said other leg and said inner surface of said weatherstrip in a manner impaling said edge portions on said barbs, said other leg being effective to maintain said headlining in spaced relationship to the underside of said roof.

References Cited by the Examiner

UNITED STATES PATENTS

| | | | |
|---|---|---|---|
| 2,814,525 | 11/57 | Thomas | 296—93 |
| 2,922,675 | 1/60 | Wernig | 296—93 |
| 3,083,048 | 3/63 | Kramer | 296—137 X |

PHILIP ARNOLD, *Primary Examiner.*

BENJAMIN HERSH, *Examiner.*